United States Patent [19]

Brueske

[11] Patent Number: 4,557,092
[45] Date of Patent: Dec. 10, 1985

[54] SAFETY REINFORCED ROOF INSULATION

[75] Inventor: Ralph H. Brueske, Kansas City, Mo.

[73] Assignee: Butler Manufacturing Company, Kansas City, Mo.

[21] Appl. No.: 643,233

[22] Filed: Aug. 22, 1984

[51] Int. Cl.$^4$ ............................ E04B 1/74; E04B 5/00
[52] U.S. Cl. ........................................ 52/404; 52/408; 428/228
[58] Field of Search ................. 52/404, 94, 96, 408, 52/811, 813, 743; 428/228, 433

[56] References Cited

U.S. PATENT DOCUMENTS 3,773,603 11/1973 Scholander ........................ 428/433
4,233,791 11/1980 Kuhl et al. ........................ 52/309.1
4,303,713 12/1981 Clemensen et al. ................ 428/121
4,375,741 3/1983 Paliwoda ........................... 52/127.1

Primary Examiner—Michael R. Lusignan
Attorney, Agent, or Firm—Shoemaker and Mattare, Ltd.

[57] ABSTRACT

An insulation blanket for the roof of a metal building installed between the roof purlins and roof paneling includes a concealed safety reinforcement of tapes or netting between the insulating material of the blanket and the interior facing thereof. The arrangement enables the reinforced insulation blanket to support the weight of a workman who inadvertently steps on it while installing a roof.

11 Claims, 7 Drawing Figures

U.S. Patent  Dec. 10, 1985  4,557,092

SAFETY REINFORCED ROOF INSULATION

BACKGROUND OF THE INVENTION

One of the more common methods of insulating a metal building is to use faced insulation which is pulled into place over the roof purlins. Roof paneling is then installed on top of the insulation compressing it at the purlin points. The insulation is usually a glass fiber blanket having a thickness of from 2" to 6". The blanket width is from 2' to 6' depending upon a range of factors.

An interior facing for the insulation is pre-applied by an insulation laminator and is normally formed of vinyl, combinations of polyester films and aluminum foil, or other known materials. The insulation facing is used for several reasons, the primary one being to serve as a vapor retarder. The facing retards the flow of moisture from the warm building interior to the cold exterior. Without the facing forming a vapor retarder, condensation could occur within the insulation blanket and/or on the cooler roof paneling.

The normal roof installation sequence is to pull the insulation blanket across the roof from eave-to-eave or from eave-to-ridge. The roof panels are then installed on the insulation. The insulation blanket is placed out ahead of the paneling by the normal width of the insulation blanket. It is strictly a lightweight product with little or no load carrying ability. The risk exists that an installer might step off of the in-place paneling onto the insulation and fall through the latter causing serious injury. Installers are aware of the danger but accidents occur due to momentary lack of attention.

Accordingly, the objective of this invention is to provide safety reinforced roof insulation having the ability to support a workman who inadvertently steps onto the insulation blanket while installing the roof of a metal building.

More particularly, it is an object of the invention to provide a safety reinforced insulation blanket having an interior facing and a reinforcement formed of tapes or netting forming an integral part of the insulation blanket and being laminated between the insulation material and the interior facing so as to be concealed within the blanket without detracting from the final interior appearance of the installed blanket.

Other features and advantages of the invention will become apparent to those skilled in the art during the course of the following description.

DETAILED DESCRIPTION

Figure 1:
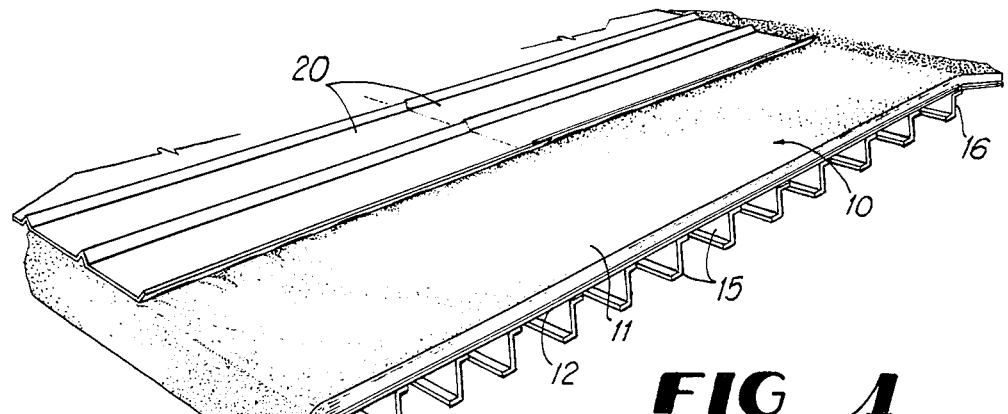
FIG. 1 is a fragmentary perspective view showing a safety reinforced insulation blanket according to the invention being used to insulate the roof of a metal building.
Figure 2:
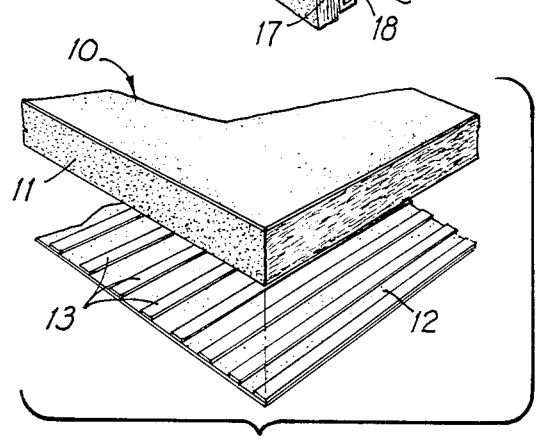
FIG. 2 is a fragmentary exploded corner perspective view of the reinforced insulation blanket according to the invention.
Figure 3:
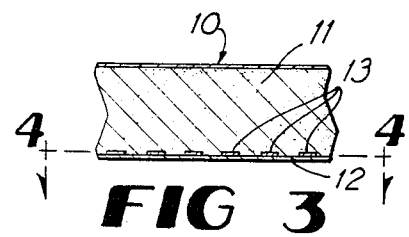
FIG. 3 is a fragmentary vertical section taken through the insulation blanket.
Figure 4:
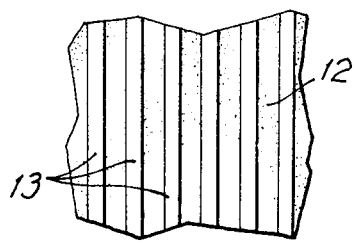
FIG. 4 is a fragmentary horizontal section taken on line 4—4 of FIG. 3.

Referring to the drawings in detail wherein like numerals designate like parts, the numeral 10 designates a safety reinforced roof insulation blanket in accordance with the present invention. The insulation blanket includes a thick layer 11 of glass fiber insulation normally having a thickness in the range of 2"-6" depending upon requirements. The insulation 11 has a width of from 2'-6'. An interior facing 12 forming a vapor retarder and imparting to the insulation blanket an inside finished appearance is laminated to the insulation layer 11 by the fabricator of the product.

In accordance with the essence of the present invention, reinforcing strips or tapes 13 are laminated between the glass fiber insulation 11 and the interior facing 12 to become a permanent and integral part of the insulation blanket. The strips or tapes 13 are preferably 1" wide and are spaced apart in parallel relationship on approximately 1½"-2" centers. The reinforcing strips are preferably formed of fiber reinforced band-type material or an equivalent material of high tensile strength. Since the tapes 13 are embedded between the insulation layer 11 and facing 12, they are concealed and do not detract from the normal interior finished appearance of the insulation blanket. The interior facing 12 can be formed of numerous known materials including vinyl, combinations of polyester films and aluminum foil, and other materials.

Figure 5:
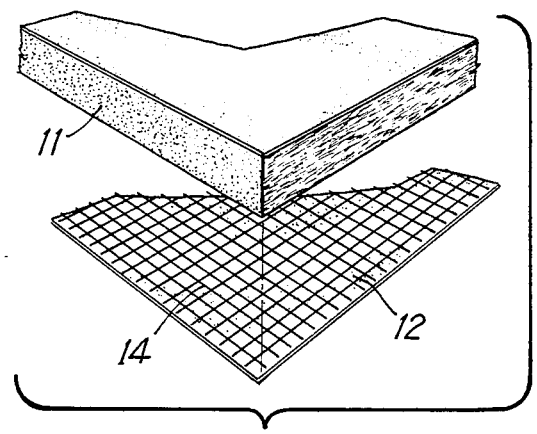
FIG. 5 is a fragmentary exploded perspective view similar to FIG. 2 showing a modification of the invention.
Figure 6:
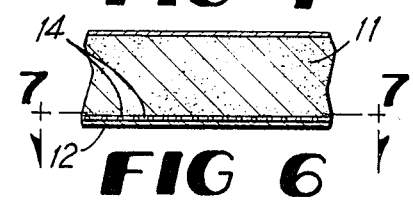
FIG. 6 is a fragmentary vertical section through the modified form of insulation blanket shown in FIG. 5 with the components united.
Figure 7:
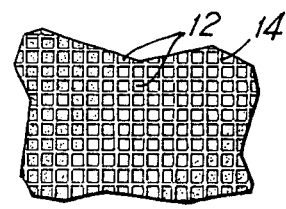
FIG. 7 is a fragmentary horizontal section taken on line 7—7 of FIG. 6.

An alternative form of safety reinforced roof insulation according to the invention is shown in FIGS. 5-7, and includes the same glass fiber insulation layer 11, previously described, the same thin interior facing 12 laminated thereto, as previously described. In lieu of the closely spaced reinforcing strips or tapes 13 of the prior embodiment, a preferably vinyl reinforcing mesh or netting 14 is laminated and enclosed between the facing 12 and insulation layer 11, as shown in FIG. 6. Preferably, the reinforcing mesh 14 is formed to provide 1" square mesh openings, although this dimension may be varied somewhat. The safety reinforcing mesh or netting 14 becomes an integral concealed component of the finished insulation blanket. Both embodiments of the invention provide a roof insulation product having the necessary strength to support the weight of a workman such as a roof installer who might inadvertently step onto the insulation blanket 10.

Typically, in the construction of a roof for a metal building, the safety reinforced insulation blanket 10 may be pulled across the roof purlins 15, FIG. 1, from eave-to-eave. Preferably, the bottom of the blanket 10 defined by the facing 12 is adhesively secured to every fourth purlin 15 and also to the ridge purlin 16. Additionally, the end portions 17 of the insulation blanket 10 are adhesively secured as at 18 to the eave struts 19 of the metal roof. The adhesive employed may be of a sprayed-on type, but preferably double faced adhesive tape is used to attach the reinforced insulation to the purlins and eave struts, as described, across the width of the blanket 10.

The reinforced insulation blanket, FIG. 1, is installed ahead of the metal roof paneling 20 which is laid down on top of the blanket 10, compressing the insulation at the purlin points. Normally, a full width insulation blanket from 2'-6' wide is placed in advance of the panels 20, as previously stated. Should a worker, standing on the panels 20, inadvertently step onto the insulation blanket 10, the integrated concealed reinforcement in the form of the tapes 13 or mesh 14 will enable the insulation to support the weight of the worker, thus preventing him from falling through the material and possibly being seriously injured or killed.

The invention adds little to the cost of the roof insulation while adding greatly to the safety of roof installers. The reinforcement, being concealed, in no way changes the normal appearance of the product, as previously noted.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A safety reinforced roof insulation particularly for metal building roofs comprising:
    means for strengthening said roof insulation internally thereof so that it can support a worker who might inadvertently step thereon including;
    a layer of thermal insulation, a bottom facing element on and united with said layer, and a safety reinforcement component disposed between said layer and facing and being concealed and forming a permanent integral component of the roof insulation.

2. A safety reinforced roof insulation as defined in claim 1, and said safety reinforcement component comprising a comparatively thin high tensile strength component laminated between said layer and facing.

3. A safety reinforced roof insulation as defined in claim 2, and said high tensile strength component comprising high tensile strength netting.

4. A safety reinforced roof insulation as defined in claim 3, and said netting comprising vinyl netting having approximately one inch square mesh openings.

5. A safety reinforced roof insulation as defined in claim 2, and said high tensile strength component comprising a multiplicity of spaced substantially parallel high tensile strength tapes.

6. A safety reinforced roof insulation as defined in claim 5, and said tapes comprising fiber reinforced tapes spaced equidistantly by a distance of approximately one and one-half inches and each tape being approximately one inch wide.

7. In an insulated roof structure, a plurality of spaced purlins and eave struts on opposite sides of the two endmost purlins, an insulation blanket adapted to be pulled across the roof purlins from eave-to-eave and resting on the tops of the purlins and lapping the outer sides of the eave struts, the insulation blanket comprising a top comparatively thick layer of thermal insulation, a bottom comparatively thin facing of sheet material forming a vapor retarder and being permanently united with said layer of thermal insulation, a comparatively thin safety reinforcement layer permanently enclosed within the insulation blanket and being concealed and being disposed between said facing of sheet material and said layer of thermal insulation, adhesive means attaching said blanket to the tops of at least some of said purlins and to the outer sides of the eave struts, and roof panels installed atop said insulation blanket.

8. In an insulated roof structure as defined in claim 7, and said thick layer of thermal insulation comprising glass fiber insulation, and said safety reinforcement layer comprising a layer of high tensile strength material.

9. In an insulated roof structure as defined in claim 8, and said high tensile strength material comprising netting.

10. In an insulated roof structure as defined in claim 8, and said high tensile strength material comprising plural closely spaced parallel high tensile strength tapes.

11. A flexible safety reinforced insulation blanket particularly for the roofs of metal buildings comprising:
    means for strengthening said insulation blanket internally thereof whereby the blanket is enabled to support the weight of a worker who inadvertently steps on said blanket including;
    an insulation blanket layer, a facing sheet united with the bottom face of the layer, and an internal safety reinforcement of comparatively high tensile strength material permanently built into and concealed within the insulation blanket and spanning substantially the entire area encompassed by the blanket.

* * * * *